EXTENSIBLE ELECTRIC CORD

Filed Sept. 13, 1950

Félix Jean Marie Dansard
INVENTOR

BY
Richardson, David and Nordon
his ATTORNEYS

Patented Sept. 15, 1953 2,652,444

UNITED STATES PATENT OFFICE 2,652,444

EXTENSIBLE ELECTRIC CORD

Félix Jean Marie Dansard, Saint-Chamond, France

Application September 13, 1950, Serial No. 184,677
In France October 5, 1949

3 Claims. (Cl. 174—69)

The present invention pertains to resiliently extensible electric cords suitable for use with telephone apparatus, laundry irons, portable lamps and the like, and more particularly to cords of this type which resist deformation by twisting.

My invention has for its object the provision of a resiliently extensible electric cord whose component elements are arranged in such a manner such that if the operator imparts a twist to the lead he cannot continue doing so without meeting a resistance that invites him to restore said cord to its normal position of use.

To this end, the improved lead associates a central elastic cord or ribbon that is not conductive for electric current with two flat ribbons that cannot yield longitudinally and that serve as supports for the electric wires, said latter ribbons being suitably interconnected at predetermined spaced points along their edges so as to allow an elastic cord to pass longitudinally between them along their middle, the ends of said elastic cord being secured against relative movement with respect to the ends of the non yielding flat ribbons while its natural length is such that when it is not tensioned the non yielding ribbons are folded accordionwise with the flexible electrical conductors extending along the non-elastic ribbons between their points of connection with one another.

These and other objects and advantages will become apparent upon reading the following specification together with the accompanying drawing forming a part hereof.

Referring to the drawing.

Figures 1, 2, 3:
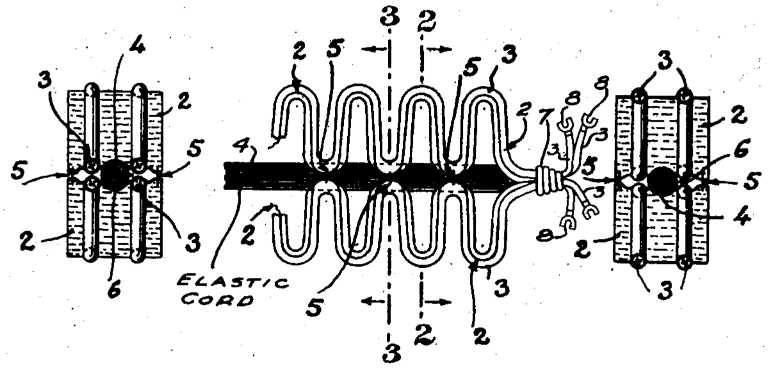
Figure 1 is a fragmentary side view showing one end of an electric cord embodying the invention.
Figure 2 is a transverse sectional view taken along the line 2—2 of Fig. 1, looking in the direction of the arrows.
Figure 3 is a transverse sectional view taken along the line 3—3 of Fig. 1, looking in the direction of the arrows.

Referring to Fig. 1, the extensible cord comprises two oppositely disposed ribbons 2 of normally flat non-elastic fabric within each of which is disposed a pair of laterally spaced flexible electrical conductors 3, the non-elastic ribbons 2 being disposed on opposite sides of a central elastic cord 4.

The ribbons 2 of non elastic fabric are laid in contact with one another and are interconnected at their edges at points 5 that are equidistant with reference to one another lengthwise along the non-elastic ribbons 2. The points of interconnection 5 are located on the same transverse line perpendicular to the longitudinal axes of the ribbons 2, thereby defining between them a free space 6 serving as a guideway for the elastic cord 4.

The elastic cord 4 is secured through means connected to its ends against relative movement with respect to the ends of the non-elastic ribbons 2 and the length of elastic cord 4 is selected so as to be normally somewhat shorter than the length of said ribbons and to produce consequently when the extensible cord is not submitted to a tensile stress a pleating of the ribbon between the successive points 5 as clearly apparent in Fig. 1.

The ends of the elastic cord 4 may be secured against relative movement with respect to the non-elastic ribbons 2, as by means such as a serving of thread or twine 7 which is shown in Fig. 1 binding one end of the ribbons 2 to one end of the elastic cord 4, and the opposite ends which are not shown may be similarly secured, if desired. The individual flexible conductors 3 extend past the end of the elastic cord 4 and the serving 7 and are shown terminating in bifurcated spade type terminals 8.

The resiliently extensible electric cord thus obtained, when twisted, offers a resistance which invites or induces the operator of an appliance connected thereto to return it into its normal shape; the consequence is that the non-elastic ribbons do not become kinked about the central elastic cord, the use of said longitudinally extensible cord being thus made easier and its life being made longer. It should be remarked moreover that the central elastic cord may be changed when required.

The connecting points 5 may be produced through hand sewing after manufacture of the two ribbons 2 but in practice they are obtained in the weaving of the non-elastic ribbons through action on the warp, the above mentioned expression "weaving" being understood in its more general sense and conveying generally also braiding, knitting and the like method of forming a fabric.

What I claim is:

1. A resiliently extensible electric cord of the class described, comprising: a central resiliently longitudinally extensible member; a pair of non-elastic flexible ribbon members disposed on opposite sides of said extensible member, the lengths of said ribbon members being greater than the unstressed length of said extensible member, opposed edge portions of said two ribbon members being interconnected at spaced points along their lengths defining a free space between said ribbon members serving as a guideway for said extensible member; means interconnecting the end portions of said ribbon members and the end portions of said extensible member for preventing relative movement therebetween; and at least one flexible electrical conductor extending longitudinally along at least one of said ribbon members, said conductor being carried by said ribbon member for flexure therewith.

2. An electric cord according to claim 1, in which said points of interconnection of said ribbon members are transversely aligned with respect to the longitudinal axis of said extensible member.

3. An electric cord according to claim 1, in which said points of interconnection of said ribbon members are equally spaced therealong.

FÉLIX JEAN MARIE DANSARD.

References Cited in the file of this patent

UNITED STATES PATENTS

| Number | Name | Date |
|---|---|---|
| 2,143,649 | Dansard | Jan. 10, 1939 |
| 2,441,236 | Dansard | May 11, 1948 |